United States Patent
Wei et al.

(10) Patent No.: US 11,858,159 B2
(45) Date of Patent: Jan. 2, 2024

(54) SYSTEM AND METHOD FOR CUTTING RECTANGULAR SHEET STOCK WITH DEFECTS

(71) Applicant: Guangdong University of Technology, Guangzhou (CN)

(72) Inventors: Lijun Wei, Guangzhou (CN); Shaowen Yao, Guangzhou (CN); Qiang Liu, Guangzhou (CN); Hao Zhang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/154,766

(22) Filed: Jan. 13, 2023

(65) Prior Publication Data
US 2023/0173703 A1 Jun. 8, 2023

(30) Foreign Application Priority Data
Mar. 3, 2022 (CN) .......................... 202210211014.2

(51) Int. Cl.
*B26D 5/00* (2006.01)
*B26D 1/08* (2006.01)

(52) U.S. Cl.
CPC ............. *B26D 5/005* (2013.01); *B26D 1/085* (2013.01)

(58) Field of Classification Search
None
See application file for complete search history.

(56) References Cited

U.S. PATENT DOCUMENTS

| 6,690,990 B1 | 2/2004 | Caron et al. |
| 2015/0375415 A1* | 12/2015 | Sausset ................. B26D 1/085 83/34 |
| 2019/0018628 A1 | 1/2019 | Sloan, IV et al. |
| 2021/0053861 A1* | 2/2021 | Van Landeghem .. G05B 19/402 |

FOREIGN PATENT DOCUMENTS

| CA | 2892576 A1 | 6/2014 |
| CN | 102152009 A | 8/2011 |
| CN | 111410414 A | 7/2020 |
| CN | 111428776 A | 7/2020 |
| CN | 112766620 A | 5/2021 |
| CN | 112939436 A | 6/2021 |

(Continued)

OTHER PUBLICATIONS

Luo et al., the English translation of Chinese Patent Document CN106312179, published Jan. 11, 2017.*

(Continued)

*Primary Examiner* — Bernard G Lindsay

(57) ABSTRACT

A cutting stock method for a rectangular sheet with defects includes: acquiring information of the rectangular defective sheet, including dimension information of the rectangular sheet and target blocks, and location information of the defects; acquiring a cutting position discrete set of the rectangular sheet; cutting the rectangular sheet according to the cutting position discrete set into a plurality of target blocks; calculating a sum of values of the target blocks, and selecting an optimal cutting solution with the largest sum of values; and cutting the rectangular sheet according to the optimal cutting solution.

4 Claims, 3 Drawing Sheets

(56) References Cited

FOREIGN PATENT DOCUMENTS

CN 113704841 A 11/2021
WO 2021245497 A1 12/2021

OTHER PUBLICATIONS

Chen et al. 'Optimization Method for Guillotine Packing of Rectangular Items within an Irregular and Defective Slate' Mathematics 2020, 8, 1914 MDPI.*
Wu et al. 'Research on Two-dimensional Cutting Problem with Defects' 2019 IEEE 10th international conference on software engineering and service science (ICSESS) Oct. 18, 2019 (pp. 1-8). IEEE.*
Martin et al. 'The constrained two-dimensional guillotine cutting problem with defects: an ILP formulation, a Benders decomposition and a CP-based algorithm' International Journal of Production Research, 2020 vol. 58, No. 9, 2712-2729, Taylor and Francis.*
Huang, Jianghai. "Research on Efficient Algorithm for Rectangular Cutting Problem with Defects" «China Master's Theses Full-text Database (Master's) Information Technology» .2020.

\* cited by examiner

SYSTEM AND METHOD FOR CUTTING RECTANGULAR SHEET STOCK WITH DEFECTS

CROSS-REFERENCE TO RELATED APPLICATIONS

This application claims the benefit of priority from Chinese Patent Application No. 202210211014.2, filed on Mar. 3, 2022. The content of the aforementioned application, including any intervening amendments thereto, is incorporated herein by reference.

TECHNICAL FIELD

The invention relates to production packing, in particular to a cutting stock approach and system for rectangular sheets with defects.

BACKGROUND

Packing problem refers to the layout and cutting of workpieces on a sheet material. A reasonable layout pattern can effectively improve the material utilization rate, reduce production costs and ensure the quality of workpieces. China is a dominant manufacturing country, and the annual consumption of raw materials for manufacturing a variety of products is considerable, where many raw materials need to be cut. A 1% rise in the material utilization rate will bring significant economic benefits.

It is commonly required to cut raw materials into various parts for subsequent manufacturing and processing, where the problems such as the cutting of wooden sheets and glass are known as two-dimensional (2D) packing optimization problems. However, raw materials may be defective due to their nature and manufacturing processes, such as knots contained in the wood, air bubbles in glass, contaminated areas in steel, and holes in natural leather, and thus cannot be used for production. Therefore, it is necessary avoiding defective regions of raw materials, the utilization rate of the raw materials is required to be as high as possible during cutting. In addition, the layout cutting should satisfy many constraints, such as guillotine cutting and non-guillotine, whether the maximum quantity of goods is limited, and whether the cutting direction of the goods can be rotated. Although the layout in different industrial sectors may under various constraints, the basic problem is to find an efficient arrangement of the required parts on the raw material to improve the utilization rate of the raw material.

At present, the methods for the layout problems of non-defective pieces are reported widely and mainly include exact solution algorithms, intelligent optimization algorithms, and heuristic algorithms. While the methods for the layout problems of defective pieces are less reported, mainly including heuristic algorithms and intelligent optimization algorithms. The heuristic algorithm is constructed based on intuition or experience, through which a feasible solution can be obtained within a certain period. But the feasible solution is unstable and cannot be judged to be optimal. The intelligent optimization algorithms are generally random search algorithms based on biological intelligence or physical phenomena, mainly including simulated annealing algorithms and genetic algorithms. The simulated annealing algorithm has the potential to obtain a global optimal solution, and thus gradually become a general method for solving optimization problems. Nevertheless, it struggles with long solution process and low solution efficiency. The genetic algorithm has good global search capability, but it also has drawbacks, such as poor local search capability, long search time, low evolutionary efficiency, slow convergence speed, and tendency for falling into local optimal solutions.

SUMMARY

In view of the defects in the prior art, this disclosure provides a cutting stock approach and system for a rectangular sheet with defects, which can be applied to the two-dimensional rectangular packing of defective sheets under the constraint of "guillotine cutting". This application can greatly reduce the size of search space of the packing problems, and improve the convergence speed of finding the solution, resulting in enhanced cutting stock efficiency for the rectangular defective sheets.

The technical solutions of the disclosure are described below.

In a first aspect, this application provides a cutting stock method for a rectangular sheet with defects, comprising:
- (S1) acquiring information of the rectangular defective sheet, wherein the information comprises size information of the rectangular defective sheet, size information of a target blocks, and location information of a defect;
- (S2) acquiring a cutting position discrete set of the rectangular defective sheet; cutting the rectangular defective sheet into two first sub-sheets according to the cutting position discrete set; if a first sub-sheet is non-defective, proceeding to step (S3), otherwise, proceeding to step (S4);
- (S3) calculating a cutting position discrete set of a non-defective first sub-sheet by using a first cutting position searching algorithm; and cutting the non-defective first sub-sheet into a plurality of target blocks according to the cutting position discrete set of the non-defective first sub-sheet;
- (S4) calculating a cutting position discrete set of a defective first sub-sheet by using a second cutting position searching algorithm; and cutting the defective first sub-sheet into two second sub-sheets according to the cutting position discrete set of the defective first sub-sheet; if a second sub-sheet is non-defective, performing step (S3); otherwise, repeating step (S4);
- (S5) calculating a sum of sizes of the plurality of target blocks; and selecting a cutting plan corresponding to the largest sum of sizes as an optimal cutting solution; and
- (S6) cutting the rectangular defective sheet according to the cutting position discrete set corresponding to the optimal cutting solution.

In some embodiments, in step (S3), the cutting position discrete set of the non-defective first sub-sheet is calculated by a first cutting position search algorithm through steps of:
  acquiring size information of the target blocks and the size information of the first sub-sheet; and subjecting the target blocks to linear combination according to width and height thereof to produce combined blocks varying in size;
  setting a bottom left vertex of the rectangular defective sheet as an origin of a Cartesian coordinate system; and generating a length combined point set within a dimensional boundary of the rectangular defective sheet based on linear combination of width of the target blocks with the origin as reference, and generating a height combined point set within the dimensional boundary of the rectangular defective sheet based on linear combination of height of the target blocks with the origin as reference;

for an x-axis discrete set of the rectangular defective sheet, successively subtracting each point r in the x-axis discrete set from a width w of the rectangular defective sheet; finding a maximum point not greater than w−r from the width combined point set followed by adding to the x-axis discrete set; and performing similar operations on a y-direction discrete set of the rectangular defective sheet; and wherein the x-axis discrete set $R^v(w)$ and the y-axis discrete set $R^v(h)$, respectively expressed as:

$$R^v(w) = \{\overline{N^v(w-z)} | z \in N^v(w)\|; \text{ and}$$

$$R^v(h) = \{\overline{N^h(h-z)} | z \in N^v(h)\};$$

wherein $\overline{N^v(n)} = \max\{z \mid z \in N^v(w)\}$; $\overline{N^v(n)} = \max\{z \mid z \in N^h(h)\};$ $$N^v(w) = \left\{ z \mid z = \sum_{i=1}^n \alpha_i w_i^s, 0 \le z \le w, \alpha_i \in \{0, 1, 2, \ldots\}, i \in I \right\};$$

$$N^h(h) = \left\{ z \mid z = \sum_{i=1}^n \alpha_i h_i^s, 0 \le z \le h, \alpha_i \in \{0, 1, 2, \ldots\}, i \in I \right\};$$

w and h represent a width and height of the rectangular defective sheet, respectively; $w_i^s$ and $h_i^s$ represent a width and height of a target block i, respectively; I represents a target block set; $N^v(w)$ represents the width combined point set; $N^h(h)$ represents the height combined point set; $\overline{N^v(n)}$ represents a maximum point not greater than n in $N^v(w)$; $\overline{N^h(n)}$ represents a maximum point not greater than n in $N^h(h)$; and αi represents the number of target blocks used in the linear combination, and α=1, 2, . . . ; and z represents a point in $N^h(h)$.

In some embodiments, in step (S4), the cutting position discrete set of the defective first sub-sheet is calculated by a second cutting position searching algorithm through steps of:

for an x-axis discrete set of the defective first sub-sheet, subtracting each point r in the x-axis discrete set in turn from a width w of the rectangular defective sheet and a left boundary of a defect j; finding a maximum point not larger than w−r and $x_j^d-r$ from the width combined point set followed by adding to the x-axis discrete set; performing similar operations on a y-axis discrete set of the defective first sub-sheet considering a height h of the rectangular defective sheet and a lower boundary $y_j^d$ of the defect j; and defining the x-axis discrete set of the defective first sub-sheet as $R_d^v(w)$ and the y-axis discrete set of the defective first sub-sheet as $R_d^h(h)$, respectively expressed by:

$$R_d^v(w) = \{\overline{N^v(w-z)} | z \in N_d^v(w)\}; \text{ and}$$

$$R_d^h(h) = \{\overline{N^h(h-z)} | z \in N_d^h(h)\};$$

wherein $N_d^v(w) = N^v(w) \cup$ $$\{z \mid z = x_j^d + w_j^d + v, j \in D, v \in N^v(w), 0 \le z \le w\};$$

$$N_d^h(h) = N^v(h) \cup \{z \mid z = y_j^d + h_j^d + v, j \in D, v \in N^h(h), 0 \le z \le h\};$$

$$N^v(w) = \left\{ z \mid z = \sum_{i=1}^n \alpha_i w_i^s, 0 \le z \le w, \alpha_i \in \{0, 1, 2, \cdots\}, i \in I \right\};$$

$$N^h(h) = \left\{ z \mid z = \sum_{i=1}^n \alpha_i h_i^s, 0 \le z \le h, \alpha_i \in \{0, 1, 2, \cdots\}, i \in I \right\};$$

-continued $$\overline{N^v(n)} = \max\{z \mid z \in N^v(w)\};$$

$$\overline{N^h(n)} = \max\{z \mid z \in N^h(h)\};$$

w and h represent a width and height of the rectangular defective sheet, respectively; $w_i^s$ and $h_i^s$ represent the width and height of the target block I, respectively; I represents the target block set; $x_j^d$, $y_j^d$ are coordinates of a lower left corner of the defect j; $w_j^d$ and $h_j^d$ are a width and height of the defect j, respectively; and D is a defect set; $N^v(w)$ represents the width combined point set; $N^h(h)$ represents the height combined point set; $\overline{N^v(n)}$ represents a maximum point not greater than n in $N^v(w)$; $\overline{N^h(n)}$ represents a maximum point not greater than n in $N^h(h)$; and α represents the number of combined target blocks, and α=1, 2, . . . ; and z represents a point in $N^h(h)$.

In some embodiments, in step (S3), the non-defective first sub-sheet is cut through steps of:

(S31) searching for a cutting position discrete set within one-half a width of the non-defective first sub-sheet;

(S32) calculating a maximum size of the plurality of target boards cut from the non-defective first sub-sheet based on all linear combinations of width and height of the target blocks; and (S33) cutting the non-defective first sub-sheet according to a cutting position discrete set corresponding to the maximum size.

In some embodiments, the number of the defect on the rectangular defective sheet is D={1, 2, . . . , m}; coordinates of a lower left corner of each defect j∈D are $(x_j^d, y_j^d)$; and a width and height of each defect are $w_j^d$ and $h_j^d$, respectively;

the rectangular defective sheet has a width of w and a height of h respectively; and I types of target blocks with a width of $w_i^s$, a height of $h_i^s$, and a size of $v_i$ are cut from the rectangular defective sheet a constraint of "guillotine cutting", and I={1, 2, . . . , n};

the target blocks are not intersected with the defect, and are configured to have a fixed orientation and to be unable to rotate; and dimensions of the rectangular defective sheet, the target blocks and the defect are all integers.

In some embodiments, in step (S5) the sum of sizes of the plurality of target blocks is calculated through steps of:

cutting a non-defective sub-sheet S=(w, h) into rectangular blocks and obtaining a maximum g(w, h) among n solutions, expressed by:

$$g(w, h) = \max\left\{ \left\{ v_i \cdot \left\lfloor \frac{w}{w_i^s} \right\rfloor \cdot \left\lfloor \frac{h}{h_i^s} \right\rfloor \right\} \middle| w_i^s \le w, h_i^s \le h, i = 1, 2, \ldots n \right\};$$

wherein $w_i^s$ and $h_i^s$ represent a width and height of the target block i, respectively; $v_i$ represents a size of the target block i; n represents a type of the target block; and w and h represent a width and height of a sub-sheet, respectively.

In a second aspect, this application provides a cutting stock system, comprising:

a memory;
a processor; and
a computer program stored on the memory;

wherein the computer program is configured to be executed by the processor; and the processor is configured to execute the computer program to implement the cutting stock method.

In a third aspect, this application provides a computer-readable storage medium, wherein a computer program is stored on the computer-readable storage medium; and the computer program is configured to be executed by a processor to implement the cutting stock method.

Compared to the prior art, the present disclosure has the following beneficial effects.

This application provides a cutting stock method aiming at layout problems of the defective rectangular sheets under constraints of guillotine. For a defective board or a non-defective board, two cutting position search algorithms are respectively adopted herein. Based on the dimensional information of the target block and the location information of the defects, a cutting position discrete set is calculated without losing the optimal solution. The rectangular sheet is cut by using this discrete set, which can significantly reduce the search space of the layout process and thus enhance the layout efficiency in production.

BRIEF DESCRIPTION OF THE DRAWINGS

The patent or application file contains FIGS. 1-2 executed in color. Copies of this patent or patent application publication with color drawing(s) will be provided by the Office upon request and payment of the necessary fee.

DETAILED DESCRIPTION OF EMBODIMENTS

Technical solutions of this application will be described in detail below with reference to embodiments and accompanying drawings, where the same or similar reference signs indicate the same or similar elements or elements having the same or similar functions. The embodiments described below with reference to the accompanying drawings are exemplary, which are merely intended to explain this application and are not to limit the present disclosure.

As used herein, the terms, such as "longitudinal", "transverse", "upper", "lower", "front", "back", "left", "right", "vertical", "horizontal", "top", "bottom", "inside", and "outside", are based on the orientation or positional relationships shown in the accompanying drawings, and are merely intended to facilitate and simplify the description of the present disclosure, rather than indicating or implying that the device or element referred to must have a particular orientation, or be constructed and operated in a particular orientation. Therefore, these terms should not be construed as limitations for this application. In addition, terms "first" and "second" may explicitly or implicitly indicate the presence of one or more of the features limited thereby. The terms "first" and "second" used herein are intended to distinguish these features without implying any order or priority.

In the description of the present disclosure, unless otherwise stated, the term "plurality" means two or more.

In the description of the present disclosure, unless otherwise specified, the terms "mounting", "connection", "joint" should be understood in a broad sense. For example, the term "connection" can be a fixed connection, removable connection, or integral connection; a mechanical connection or electrical connection; a direct connection or indirect connection through an intermediate medium, or an internal connection of two components. For one of ordinary skill in the art, the specific meaning of the above terms in the description can be understood in specific cases.

Figure 1:
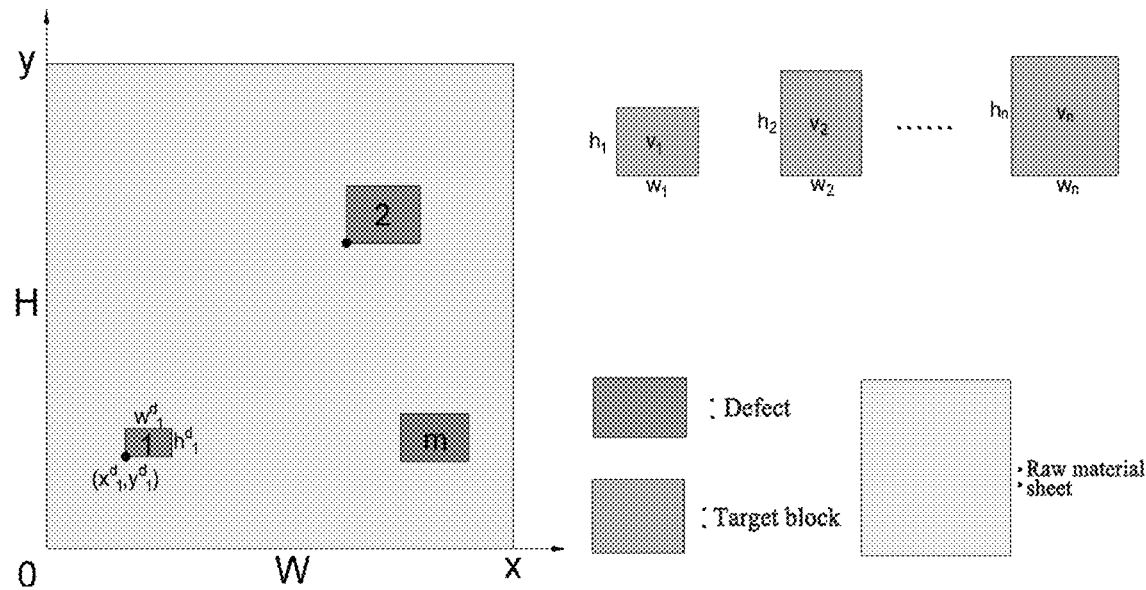
FIG. 1 schematically illustrates a packing pattern for a rectangular defective sheet according to an embodiment of this disclosure.
Figure 2:
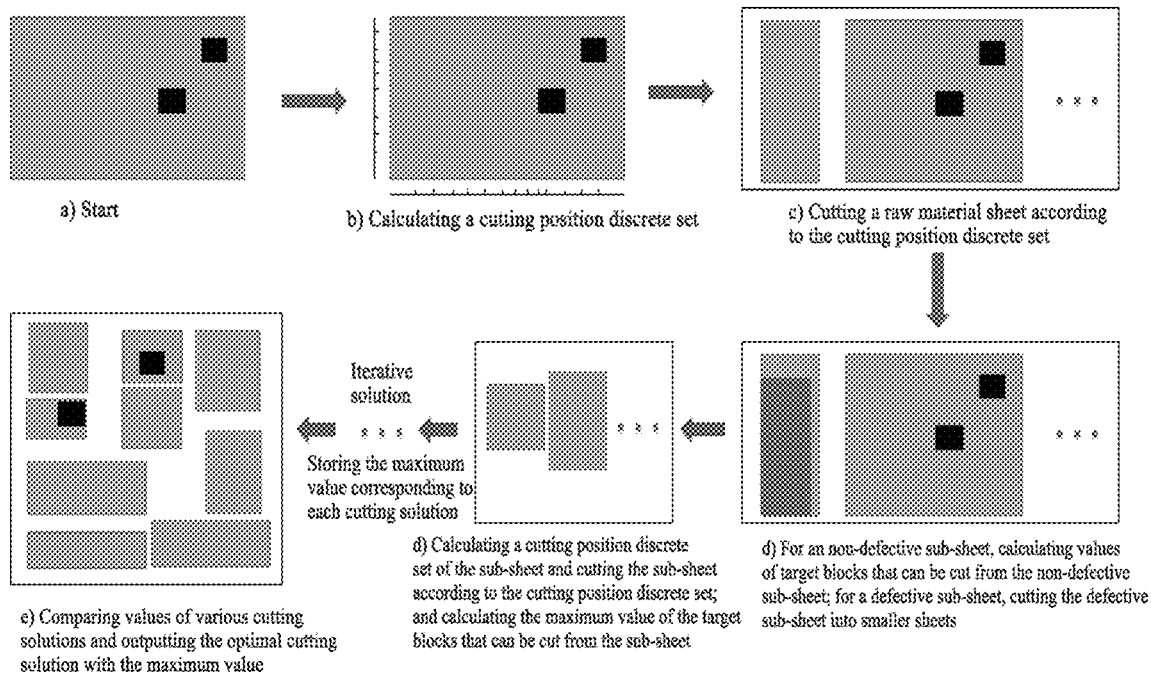
FIG. 2 schematically illustrates a packing process according to an embodiment of this disclosure.
Figure 3:
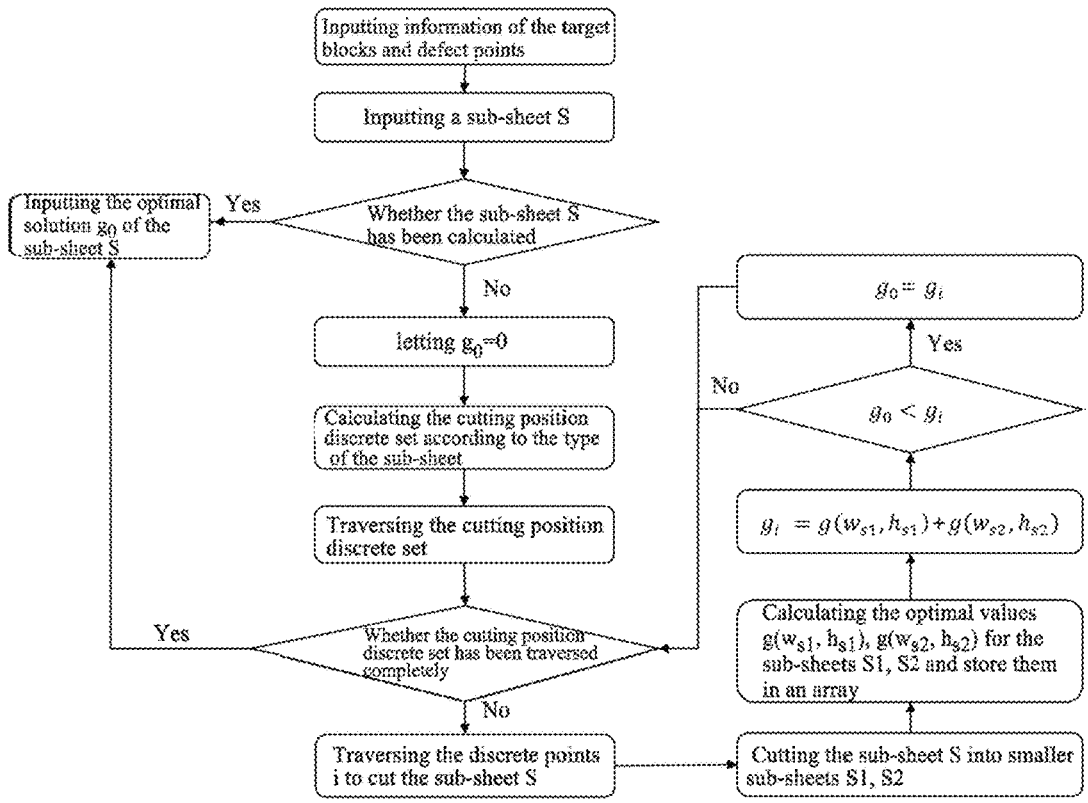
FIG. 3 is a flow chart of the cutting stock method according to an embodiment of this disclosure.
Figure 4:
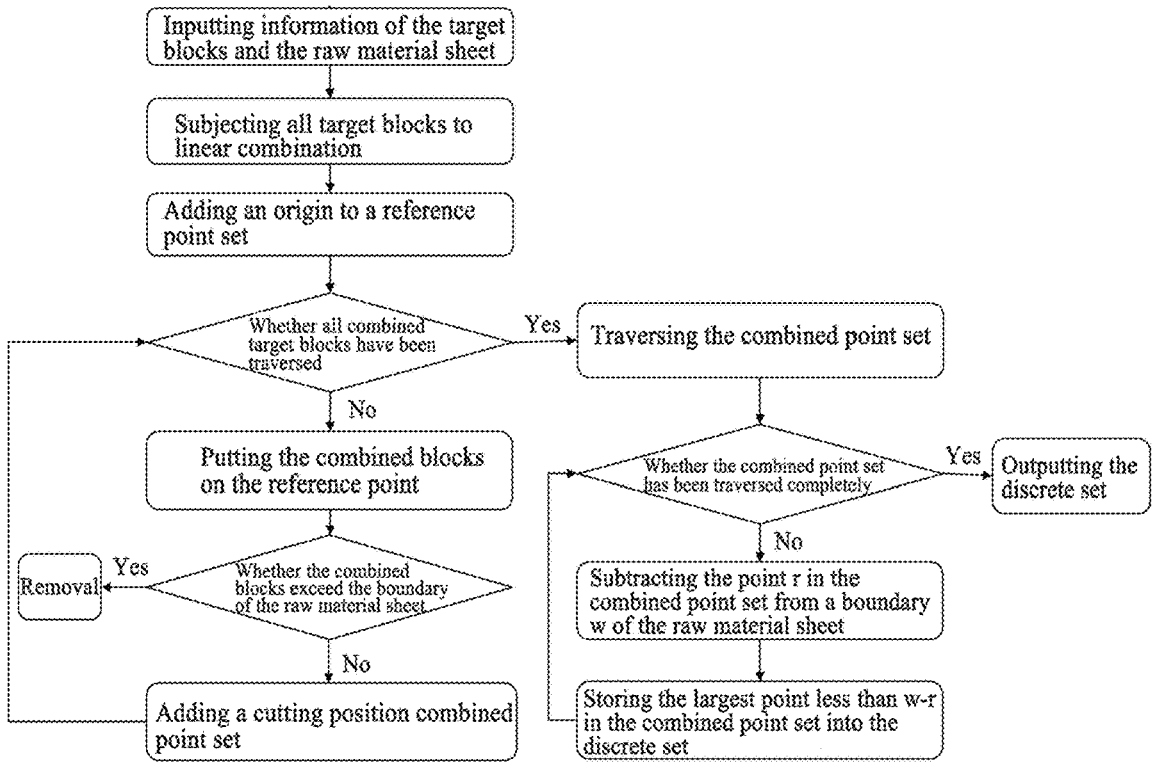
FIG. 4 is a flow chart of a cutting position searching algorithm for a non-defective sheet according to an embodiment of this disclosure.
Figure 5:
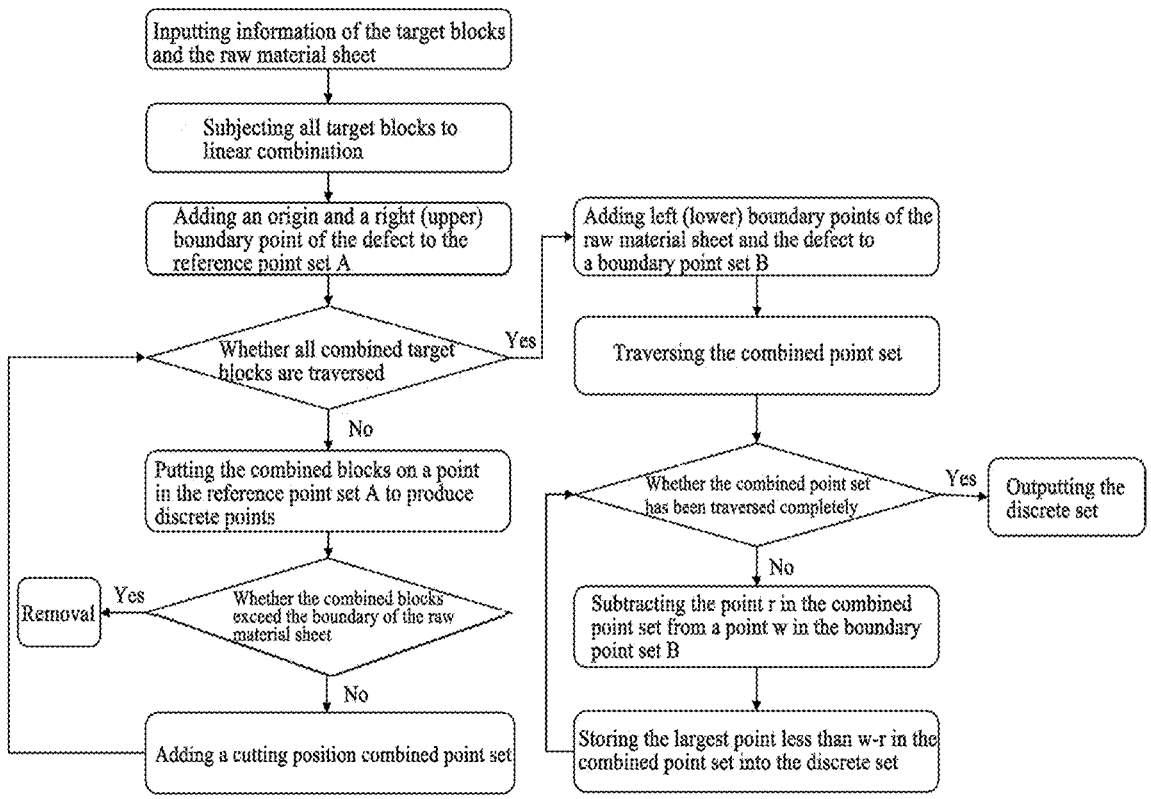
FIG. 5 is a flow chart of a cutting position searching algorithm for a defective board according to an embodiment of this disclosure.

A cutting stock method for a rectangular defective sheet will be described in this embodiment referring to FIGS. 1-5.

Provided is a cutting stock method for a rectangular defective sheet, which includes the following steps.

(S1) Information of the rectangular defective sheet is acquired, where the information includes size information of the rectangular defective sheet, size information of a target blocks, and location information of a defect.

(S2) A cutting position discrete set of the rectangular defective sheet is acquired. The rectangular defective sheet is cut once according to the cutting position discrete set to produce two first sub-sheets. If a first sub-sheet is non-defective, step (S3) is performed, otherwise, step (S4) is performed.

(S3) The non-defective first sub-sheet is cut into a plurality of target blocks according to a cutting position discrete set of the non-defective first sub-sheet.

(S4) The first defective first sub-sheet is cut into two second sub-sheets according to a cutting position discrete set of the defective first sub-sheets. If a second sub-sheet is non-defective, step (S3) is performed; and if the second sub-sheet is defective, then step (S4) is repeated.

(S5) A sum of sizes of the plurality of target blocks is calculated. A cutting plan corresponding to the largest sum of sizes is selected as an optimal cutting solution.

(S6) The rectangular defective sheet is cut according to the cutting position discrete set corresponding to the optimal cutting solution.

Specifically, this application provides a cutting stock method aiming at layout problems of the rectangular defective sheet under constraints of guillotine. For a defective sheet or a non-defective sheet, two cutting position search algorithms are respectively adopted herein. Based on the size information of the target block and the location information of the defects, a cutting position discrete set is calculated without losing the optimal solution. The rectangular sheet is cut by using this discrete set, which can significantly reduce the search space of the layout process and thus enhance the layout efficiency in production.

Specifically, in the layout method provided herein, the size information of the rectangular defective sheet and the target block, and the coordinate information of the defects are acquired. Then the cutting position discrete set in the rectangular defective sheet is calculated through the cutting position search algorithm. The rectangular defective sheet is cut according to the points in the discrete set. Each cutting will produce two sub-sheets, including a non-defective sheet and a defective sheet. The type of the sub-sheets is determined after each cutting. If the sub-sheet is non-defective, then the non-defective sub-sheet is cut into the target block as required, and the size of the target block is also calculated. If the sub-sheet is defective, the iterative search continues according to the cutting position discrete set of the defective sub-sheet for the next cutting, so as to gradually divide the defective sub-sheet into multiple non-defective sub-sheets and defective sub-sheets until the area of the defective sub-sheet is approximately equal to the defective region. The sizes of all the obtained target blocks are added up to obtain the sum of the sizes. All possible cutting positions are traversed, and the sum of the sizes of target blocks obtained by each cutting solution is calculated and stored. Different cutting solutions are traversed, the above steps for cutting and calculating and storing the sizes are repeated. Then the maximum sizes obtained by those cutting solutions are compared to find the cutting solution corresponding to the largest sum of sizes as the optimal cutting solution, which is then used for practical production.

The cutting stock method provided herein is applied to solve the layout problems of two-dimensional (2D) rectangular sheets under constraints of "guillotine cutting". The "guillotine cutting" refers to that during cutting, a single cutting action must be made from one side of the rectangular sheet to the opposite side thereof to divide the rectangular sheet into two separate small rectangular blocks, where the set of cutting positioning points is called the discrete set. In this case, the rectangular sheet is cut several times to form a plurality of rectangular sub-sheets, which are neither scrap nor goods and are called sub-sheets. Those sub-sheets are divided into P-sheets (non-defective sheets) and C-sheets (defective sheets), according to whether they contain defects or not. The position where the guillotine cutting is made on the sub-sheets is called the cutting position. The target block is the non-defective sheet cut from the sub-sheets. The size of the target block is set according to the requirements of the product.

In some embodiments, in step (S3), the cutting position discrete set of the non-defective sheet is calculated by a first cutting position search algorithm through the following steps.

The size information of target blocks and the size information of the rectangular defective sheet are acquired. The target blocks are subjected to linear combination according to length and width thereof to produce combined blocks varying in size.

A bottom left vertex of the rectangular defective sheet is set as an origin of Cartesian coordinate system. A width combined point set within a dimensional boundary of the rectangular defective sheet is generated based on linear combinations of width of the target blocks with the origin as reference. A height combined point set within a dimensional boundary of the rectangular defective sheet is generated based on linear combinations of height of the target blocks with the origin as reference.

For an x-axis discrete set of the rectangular defective sheet, each point r in the x-axis discrete set is subtracted from a width w of the rectangular defective sheet. A maximum point not greater than w−r is found from the width combined point set, and the maximum point is then added to the x-axis discrete set. Similar operations are performed on a y-axis discrete set of the rectangular defective sheet.

The x-axis discrete set of the rectangular defective sheet is denoted as $R^v(w)$ and the y-axis discrete set of the rectangular defective sheet is denoted as $R^v(h)$, respectively expressed by:

$$R^v(w) = \{\overline{N^v(w-z)} | z \in N^v(w)\}; \text{ and}$$

$$R^v(h) = \{\overline{N^v(h-z)} | z \in N^v(h)\};$$

where $\overline{N^v(n)} = \max\{z \mid z \in N^v(w)\}; \overline{N^h(n)} = \max\{z \mid z \in N^h(h)\};$ $$N^v(w) = \{z \mid z = \sum_{i=1}^{n} \alpha_i w_i^s, 0 \leq z \leq w, \alpha_i \in \{0, 1, 2, \ldots\}, i \in I\};$$

$$N^h(h) = \{z \mid z = \sum_{i=1}^{n} \alpha_i w_i^s, 0 \leq z \leq h, \alpha_i \in \{0, 1, 2, \ldots\}, i \in I\};$$

w and h represent a width and height of the rectangular defective sheet, respectively; $w_i^s$ and $h_i^s$ represent a width and height of a target block i, respectively; I represents a target block set; $N^v(w)$ represents the width combined point set; $N^h(h)$ represents the height combined point set; $\overline{N^v(n)}$ represents a maximum point not greater than n in $N^v(w)$; $\overline{N^h(n)}$ represents a maximum point not greater than n in $N^h(h)$; and α represents the number of combined target blocks, and α=1, 2, . . . ; and z represents a point in $N^h(h)$.

In some embodiments, in step (S4), the cutting position discrete set of the defective first sub-sheet is calculated by a second cutting position searching algorithm through the following steps.

For an x-axis discrete set of the defective first sub-sheet, each point r in the point set is subtracted from a width w of the rectangular defective sheet and a left boundary of a defect j. A maximum point not larger than w−r and $x_j^d$−r is found from the length combined point set, and the maximum point is added to the x-axis discrete set. Similar operations are performed on a y-axis discrete set of the defective first sub-sheet considering a height h of the rectangular defective sheet and a lower boundary $y_j^d$ of defect j.

The x-axis discrete set of the defective first sub-sheet is donated as $R_d^v(w)$ and the y-axis discrete set of the defective first sub-sheet is donated as $R_d^h(h)$, respectively expressed by:

$$R_d^v(w) = \{\overline{N^v(w-z)} | z \in N_d^v(w)\}; \text{ and}$$

$$R_d^h(h) = \{\overline{N^v(h-z)} | z \in N_d^h(h)\};$$

where $N_d^v(w) = N^v(w) \cup$ $\{z \mid z = x_j^d + w_j^d + v, j \in D, v \in N^v(w), 0 \leq z \leq w\};$ $N_d^h(h) = N^v(h) \cup \{z \mid z = y_j^d + h_j^d + v, j \in D, v \in N^h(h), 0 \leq z \leq h\};$ $N^v(w) = \{z \mid z = \sum_{i=1}^{n} \alpha_i w_i^s, 0 \leq z \leq w, \alpha_i \in \{0, 1, 2, \ldots\}, i \in I\};$ $N^h(h) = \{z \mid z = \sum_{i=1}^{n} \alpha_i h_i^s, 0 \leq z \leq h, \alpha_i \in \{0, 1, 2, \ldots\}, i \in I\};$ $\overline{N^v(n)} = \max\{z \mid z \in N^v(w)\};$ $\overline{N^h(n)} = \max\{z \mid z \in N^h(h)\};$ w and h represent a width and height of the rectangular defective sheet, respectively; $w_i^s$ and $h_i^s$ represent the width and height of the target block I, respectively; I represents the target block set; $x_j^d$, $y_j^d$ are coordinates of a lower left corner of the defect j; $w_j^d$ and $h_j^d$ are a length and width of the defect j, respectively; and D is a defect set; $N^v(w)$ represents the width combined point set; $N^h(h)$ represents the height combined point set; $\overline{N^v(n)}$ represents a maximum point not greater than n in $N^v(w)$; $\overline{N^h(n)}$ represents a maximum point not greater than n in $N^h(h)$; and a represents the number of combined target blocks, and α=1, 2, . . . ; and z represents a point in $N^h(h)$.

Specifically, for the defective sheet, the influence of defects needs to be considered on the basis of the non-defective discrete points. When calculating the combined point, besides the discrete points generated with the bottom left vertex of the cut board as a reference, the x-axis discrete points generated with the right boundary of the defect as a reference and the y-axis discrete points generated with the right boundary of the defect as a reference should be considered.

In some embodiments, in step (S3), the non-defective first sub-sheet is cut through the following steps.

(S31) A cutting position discrete point set within one-half a width of the non-defective first sub-sheet is searched.

(S32) A maximum size of the plurality of target blocks that can be cut from the non-defective first sub-sheet is calculated based on all the linear combinations of width and height of the target blocks.

(S33) The non-defective first sub-sheet is cut according to a cutting position discrete set corresponding to the maximum size.

Specifically, since the non-defective sheet is rectangular, symmetrical, and free of defective regions, the size of the target block can be read directly. Moreover, the cutting position discrete set within one-half the length of the target block can be searched iteratively according to the size of the target block, so as to obtain the cutting plan corresponding to the maximum size of the target block. The non-defective sheet can be divided into a plurality of target blocks according to the cutting positions discrete set, enhancing the searching efficiency.

In some embodiments, the number of the defects on the rectangular defective sheet is D={1, 2, . . . , m}; coordinates of a lower left corner of each defect j∈D are $(x_j^d, y_j^d)$; and a width and height of each defect are $w_j^d$ and $h_j^d$, respectively; the rectangular defective sheet has a width of w and a height of h respectively, and I types of target blocks with a width of $w_i^s$, a height of $h_i^s$, and a size of $v_i$ are cut from the rectangular defective sheet a constraint of "guillotine cutting", and I={1, 2, . . . , n}; the target blocks are not intersected with the defect, and are configured to have a fixed orientation and to be unable to rotate; and dimensions of the rectangular defective sheet, the target blocks and the defect are all integers.

Specifically, the defective regions and target block areas are pre-defined herein to render easy marking for different defective regions and target blocks in the cutting position search algorithm, which facilitates the search and calculation of the algorithm.

In some embodiments, in step (S5), the sum of sizes of the plurality of target blocks is calculated through the following steps.

The non-defective sub-sheet S=(w, h) is cut into rectangular blocks to obtain the maximum sum of sizes from n solutions, expressed by:

$$g(w, h) = \max\left\{\left\{v_i \cdot \left\lfloor \frac{w}{w_i^s} \right\rfloor \cdot \left\lfloor \frac{h}{h_i^s} \right\rfloor\right\} \mid w_i^s \leq w, h_i^s \leq h, i = 1, 2, \ldots n\right\};$$

where $w_i^s$ and $h_i^s$ represent a length and width of the target block i, respectively; $v_i$ represents a size of the target block i; n represents a type of the target block; and w and h represent a length and width of a sub-sheet, respectively.

In this embodiment, the information of the target block and the defective region is input in the algorithm and initialized with $g_0=0$. The type of sub-boards is determined, and the cutting position discrete set is calculated for the defective and non-defective sheets, respectively. The cutting position discrete set at different locations are traversed and compared. Specifically, the optimal sizes of two sub-sheets $g(w_{s1}, h_{s1})$ and $g(w_{s2}, h_{s2})$ obtained after each cutting are calculated, and $g_i$ is also calculated, where $g_i=g(w_{s1}, h_{s1})+g(w_{s2}, h_{s2})$; and $w_{s1}$, $h_{s1}$, $w_{s2}$, and $h_{s2}$ are the position parameters of the target block. The above steps are traversed until the target size $g_i$ is maximum to end the loop and output the maximum size and the corresponding cutting solution. The cutting solution is then applied to the actual cutting process.

This application also provides a cutting stock system, which includes a memory, a processor, and a computer program stored on the memory. The computer program is configured to be executed by the processor. The processor is configured to execute the computer program to implement the cutting stock method.

This application further provides a computer-readable storage medium. The computer program is stored on the computer-readable storage medium. The computer program is configured to be executed by a processor to implement the aforementioned cutting stock method.

Other components and operations of the cutting stock method and system for the defective rectangular sheets provided herein are known to one of ordinary skill in the art and will not be described in detail here.

The modules of the above-mentioned cutting stock system can be implemented as a whole or in part by means of software, hardware and combinations thereof. The modules may be embedded in hardware or in a processor independent of the electronic device, or stored in software in the memory of the electronic device so that the processor can call up and perform the operations corresponding to those modules.

One of ordinary skill in the art can understand that the computer program can instruct the relevant hardware to implement all or part of the operations in the method of the above embodiments. The computer program may be stored in a non-volatile computer readable storage medium and may include aforementioned operations when executed. In addition, any references to memory, storage, databases or other media used herein may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration rather than limitation, RAM is available in various forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), memory bus (Rambus) direct RAM (RDRAM), direct memory bus dynamic RAM (DRDRAM), and memory bus dynamic RAM (RDRAM).

It will be clear to those skilled in the art that, for convenient and brief description, the above-mentioned division of each functional unit and module is given as an example. In actual application, the above-mentioned functions can be assigned to be completed by different functional units and modules as needed, that is, the internal structure of the device is divided into different functional units or modules to complete all or part of the above-described functions.

The above description of embodiments is merely intended to illustrate the technical routes and features of the present disclosure to enable those skilled in the art to understand and implement the technical solutions of the present disclosure. Nonetheless, the present disclosure is not limited to the embodiments described above. All variations or modifications made without departing from the spirit of the disclosure shall fall within the scope of the present disclosure defined by the appended claims.

What is claimed is:

1. A cutting stock method for a rectangular defective sheet, comprising:
(S1) acquiring information of the rectangular defective sheet, wherein the information comprises size information of the rectangular defective sheet, size information of target blocks, and location information of a defect;
(S2) acquiring a cutting position discrete set of the rectangular defective sheet; cutting the rectangular defective sheet into two first sub-sheets according to the cutting position discrete set; if a first sub-sheet is non-defective, proceeding to step (S3), otherwise, proceeding to step (S4);
(S3) calculating a cutting position discrete set of a non-defective first sub-sheet by using a first cutting position searching algorithm; and cutting the non-defective first sub-sheet into a plurality of target blocks according to the cutting position discrete set of the non-defective first sub-sheet;
wherein the step (S3) is performed through steps of:
(S30) acquiring size information of the plurality of target blocks and the size information of the first sub-sheet; and according to width and height of the plurality of target blocks, producing combined blocks varying in size;
setting a bottom left vertex of the rectangular defective sheet as an origin of a Cartesian coordinate system; generating a width combined point set within a dimensional boundary of the rectangular defective sheet based on the width of the plurality of target blocks with the origin as reference; and generating a height combined point set within the dimensional boundary of the rectangular defective sheet based on the height of the plurality of target blocks with the origin as reference;
for an x-axis discrete set of the rectangular defective sheet, successively subtracting each point r in the x-axis discrete set from a width w of the rectangular defective sheet; finding a maximum point not greater than w−r from the width combined point set followed by adding to the x-axis discrete set; and for a y-axis discrete set of the rectangular defective sheet, successively subtracting each point r in the y-axis discrete set from a height h of the rectangular defective sheet; finding a maximum point not greater than h−r from the height combined point set followed by adding to the y-axis discrete set;
wherein the x-axis discrete set $R^v(w)$ and the y-axis discrete set $R^h(h)$, respectively expressed as:

$R^v(w) = \{\overline{N^v(w-z)} | z \in N^v(w)\}$; and $R^h(h) = \{\overline{N^h(h-z)} | z \in N^h(h)\}$;

wherein $\overline{N^v(n)} = \max\{z \mid z \in N^v(w)\}$; $\overline{N^h(n)} = \max\{z \mid z \in N^h(h)\}$;

$N^v(w) = \{z \mid z = \sum_{i=1}^{n} \alpha_i w_i^s, 0 \le z \le w, \alpha_i \in \{0, 1, 2, ...\}, i \in I\}$;

$N^h(h) = \{z \mid z = \sum_{i=1}^{n} \alpha_i h_i^s, 0 \le z \le h, \alpha_i \in \{0, 1, 2, ...\}, i \in I\}$;

w and h represent the width and height of the rectangular defective sheet, respectively; $w_i^s$ and $h_i^s$ represent a width and height of a target block i, respectively; I represents a target block set; $N^v(w)$ represents the width combined point set; $N^h(h)$ represents the height combined point set; $\overline{N^v(n)}$ represents a maximum point not greater than n in $N^v(w)$; $\overline{N^h(n)}$ represents a maximum point not greater than n in $N^h(h)$; and $\alpha_i$ represents the number of target blocks, and $\alpha=1, 2, \ldots$; and z represents a point in $N^h(h)$;

(S31) searching for a cutting position discrete set within one-half a width of the non-defective first sub-sheet;
(S32) calculating a maximum size of the plurality of target blocks cut from the non-defective first sub-sheet based on the width and height of the plurality of target blocks; and
(S33) cutting the non-defective first sub-sheet according to a cutting position discrete set corresponding to the maximum size;
(S4) calculating a cutting position discrete set of a defective first sub-sheet by using a second cutting position searching algorithm; and cutting the defective first sub-sheet into two second sub-sheets according to the cutting position discrete set of the defective first sub-sheet; if a second sub-sheet is non-defective, performing step (S3); otherwise, repeating step (S4);
wherein the cutting position discrete set of the defective first sub-sheet is calculated through steps of:
for an x-axis discrete set of the defective first sub-sheet, subtracting each point r in the x-axis discrete set in turn from a width w of the rectangular defective sheet and a left boundary of a defect j; finding a maximum point not larger than w−r and $x_j^d$−r from the width combined point set followed by adding to the x-axis discrete set; for a y-axis discrete set of the defective first sub-sheet, subtracting each point r in the y-axis discrete set in turn from a height h of the rectangular defective sheet and a lower boundary $y_j^d$ of the defect j; finding a maximum point not larger than h−r and $y_j^d$−r from the height combined point set followed by adding to the y-axis discrete set; and
defining the x-axis discrete set of the defective first sub-sheet as $R_d^v(w)$ and the y-axis discrete set of the defective first sub-sheet as $R_d^h(h)$, respectively expressed by:

$R_d^v(w) = \{\overline{N^v(w-z)} | z \in N_d^v(w)\}$; and $R_d^h(h) = \{\overline{N^h(h-z)} | z \in N_d^h(h)\}$;

wherein $N_d^v(w) = N^v(w) \cup$ $\{z \mid z = x_j^d + w_j^d + v, j \in D, v \in N^v(w), 0 \le z \le w\}$;

$N_d^h(h) = N^h(h) \cup \{z \mid z = y_j^d + h_j^d + v, j \in D, v \in N^h(h), 0 \le z \le h\}$;

$N^v(w) = \{z \mid z = \sum_{i=1}^{n} \alpha_i w_i^s, 0 \le z \le w, \alpha_i \in \{0, 1, 2, ...\}, i \in I\}$;

$N^h(h) = \{z \mid z = \sum_{i=1}^{n} \alpha_i h_i^s, 0 \le z \le h, \alpha_i \in \{0, 1, 2, ...\}, i \in I\}$;

$\overline{N^v(n)} = \max\{z \mid z \in N^v(w)\}$;

$\overline{N^h(n)} = \max\{z \mid z \in N^h(h)\}$;

w and h represent the width and height of the rectangular defective sheet, respectively; $w_i^s$ and $h_i^s$ represent the width and height of the target block I, respectively; I represents the target block set; $x_j^d$, $y_j^d$ are coordinates of a lower left corner of the defect j; $w_j^d$ and $h_j^d$ are a width and height of the defect j, respectively; and D is a defect set; $N^v(w)$ represents the width combined point set; $N^h(h)$ represents the height combined point set; $\overline{N^v(n)}$ represents a maximum point not greater than n in $N^v(w)$; $\overline{N^h(n)}$ represents a maximum point not greater than n in $N^h(h)$; and α represents the number of combined target blocks, and α=1, 2, . . . ; and z represents a point in $N^h(h)$;

(S5) calculating a sum of sizes of the plurality of target blocks; and selecting a cutting plan corresponding to the largest sum of numbers as an optimal cutting solution;

wherein the sum of sizes of the plurality of target blocks is calculated through steps of:

for a non-defective sub-sheet S=(w,h), defining g(w,h) as a maximal size obtained by guillotine cutting; and calculating the maximal size g(w,h) through the following equation:

$$g(w, h) = \max\left\{\left\{v_i \cdot \left\lfloor \frac{w}{w_i^s} \right\rfloor \cdot \left\lfloor \frac{h}{h_i^s} \right\rfloor\right\} \mid w_i^s \leq w, h_i^s \leq h, i = 1, 2, \ldots n\right\};$$

wherein $w_i^s$ and $h_i^s$ represent a width and height of the target block i, respectively; $v_i$ represents a size of the target block i; n represents a type of the target block; and w and h represent a width and height of a sub-sheet, respectively; and (S6) cutting the rectangular defective sheet according to the cutting position discrete set corresponding to the optimal cutting solution.

2. The cutting stock method of claim 1, wherein the number of the defect on the rectangular defective sheet is D={1, 2, . . . , m}; coordinates of a lower left corner of each defect j∈D are $(x_j^d, y_j^d)$; and a width and height of each defect are $w_j^d$ and $h_j^d$, respectively;

the rectangular defective sheet has a width of w and a height of h; and I types of target blocks with a width of $w_i^s$, a height of $h_i^s$, and a size of $v_i$ are cut from the rectangular defective sheet, and l={1, 2, . . . , n};

the target blocks are not intersected with the defect, and are configured to have a fixed orientation and to be unable to rotate; and dimensions of the rectangular defective sheet, the target blocks and the defect are all integers.

3. A cutting stock system, comprising:
a memory;
a processor; and
a computer program stored on the memory;
wherein the computer program is configured to be executed by the processor; and the processor is configured to execute the computer program to implement the cutting stock method of claim 1.

4. A non-transitory computer-readable storage medium, wherein a computer program is stored on the computer-readable storage medium; and the computer program is configured to be executed by a processor to implement the cutting stock method of claim 1.

\* \* \* \* \*